United States Patent [19]

Wentworth et al.

[11] Patent Number: 4,905,292
[45] Date of Patent: Feb. 27, 1990

[54] HIGH PROBABILITY OF DETECTION, LOW FALSE ALARM MULTISENSOR ATR

[75] Inventors: Edwin W. Wentworth, Woodbridge; Stuart B. Horn, Fairfax, both of Va.

[73] Assignee: The United States of America as represented by the Secretary of the Army, Washington, D.C.

[21] Appl. No.: 95,784

[22] Filed: Sep. 14, 1987

[51] Int. Cl.$^4$ ................................................ G06K 9/00
[52] U.S. Cl. .......................................... 382/1; 342/53; 358/113
[58] Field of Search ............................ 244/3.16, 3.19; 102/427, 214, 213, 211; 250/330, 330.1; 356/51; 358/113; 382/1, 10, 48; 342/53, 54

[56] References Cited

U.S. PATENT DOCUMENTS

| | | | |
|---|---|---|---|
| 3,934,250 | 1/1976 | Martin, Jr. ............................ | 342/53 |
| 4,157,544 | 6/1979 | Nichols .................................. | 342/54 |
| 4,317,117 | 2/1982 | Chasek ................................... | 342/53 |
| 4,408,533 | 10/1983 | Owen et al. .......................... | 102/211 |
| 4,497,065 | 1/1985 | Tisdale et al. ........................ | 382/1 |
| 4,608,599 | 8/1986 | Kaneko et al. ....................... | 358/113 |
| 4,685,143 | 8/1987 | Choate ................................... | 382/22 |
| 4,761,652 | 8/1988 | Pirolli et al. .......................... | 342/53 |
| 4,765,244 | 8/1988 | Spector et al. ....................... | 102/213 |

Primary Examiner—Leo H. Boudreau
Assistant Examiner—Jose L. Couso
Attorney, Agent, or Firm—Max L. Harwell; John E. Holford; Anthony T. Lane

[57] ABSTRACT

An Aided Target Recognition System (ATR) is provided wherein the recognition abilities of two ATR sensor subsystems with mutually exclusive false alarm characteristics are fused by a decision circuit to provide an improved false alarm rate versus the probability of target detection. The sensors, which respond to different types of radiation, have different false alarm patterns for the same set of targets and a decision circuit which contains logical function elements to exploit the difference in these patterns.

6 Claims, 1 Drawing Sheet

HIGH PROBABILITY OF DETECTION, LOW FALSE ALARM MULTISENSOR ATR

BACKGROUND OF THE INVENTION

1. Field

The invention relates to automatic target recognition systems. Since experience has shown that such recognition is only a probability these systems are now referred to as Aided Target Recognition system (ATR'S).

2. Prior Art

Prior art ATR systems have been attempted with every type of sensor including both active and passive types. The probability of recognizing a given target is directly proportional to the amount of information (e.g. contrast variations) known about the target, i.e. data supplied by sensors. Active sensors like RADAR, SONAR and LIDAR often provide more useful information than passive sensors such as TV cameras and IR imagers, however, the latter type of sensor is preferred for covert operation, which is often required for tactical military operations and many civilian users.

To maximize the probability of detection of a specific target with an optical or passive type sensor, the threshold parameters required to identify a target must be reduced to a minimum. This in turn increases the likelihood that another target found by that sensor will be mistaken for the specific target, thus increasing the error or false alarm rate. The user is thus placed on the horns of a dilemma in trying to decide whether probability of detection is more important than false alarms. The problem is eased by selecting a smart sensor, i.e., a sensor which has the highest probability of detection for a given false alarm rate. Potentially smarter systems with two sensors exist, but where automatic recognition is employed it has been the policy of system designers to make all decisions only with the smartest sensor. Thus the Forward Looking Infrared Imager (FLIR); a smart sensor as opposed to a TV camera or an image intensifier, which are easily confused by shadows and camouflage; has emerged as the decision maker in most passive systems.

SUMMARY OF THE INVENTION

The present invention provides an ATR system which fuses the decision making capabilities of two ATR sensor subsystems, which respond to different types of radiation emanating from the same set of targets. The ATR subsystems must have different patterns of false alarms for the same set of targets, such that the common false alarm rate approaches zero.

BRIEF DESCRIPTION OF THE DRAWINGS

The invention is best understood with reference to the drawings, wherein.

DESCRIPTION OF THE PREFERRED EMBODIMENT

Figure 1:
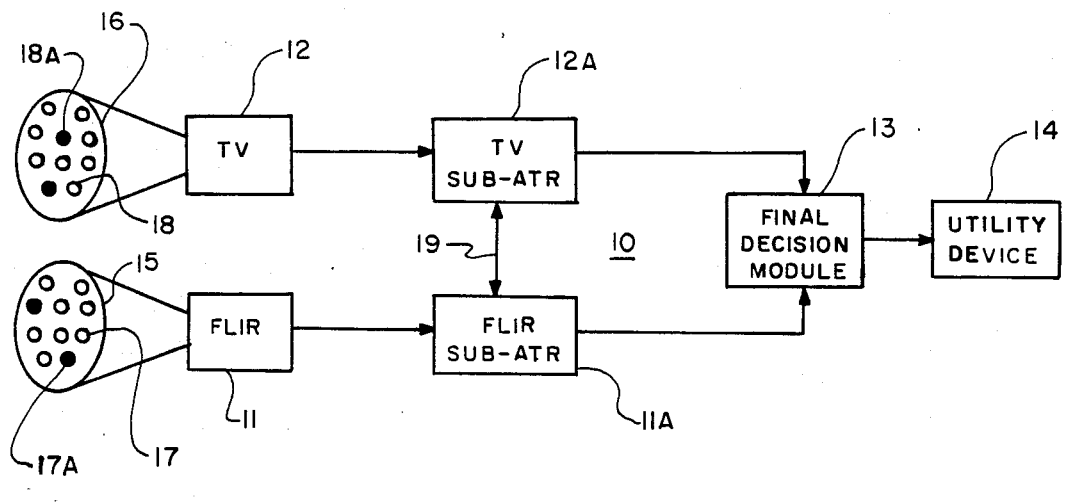
FIG. 1 shows a block diagram of an ATR system according to the present invention.

FIG. 1 shows a block diagram of a preferred embodiment of an ATR system according to the present invention. The system 10 employs a first TV type sensor with a field of view 16 which detects targets 18 in the visible and near visible portion of the electromagnetic spectrum. A second Forward Looking Infrared (FLIR) sensor with a similar field of view 15 which detects targets 17 in the far-infrared is also included. An ATR subcircuit 11A or 12A is connected at its input to the output of each sensor. The outputs of the subcircuits are connected to a like number of inputs on a final decision module 13. It is preferred that the subcircuits and the final decision module form a single unit. A communication link 19 is provided between each pair of subcircuits which may be a one way link in some cases. The output of the decision module is connected to the input of a utility device 14

The function of the ATR subcircuit is to select probable targets, store their location (and extent), and evaluate each target as to its type and importance to a utility device, such as a weapons system. To achieve this the subcircuit is provided with a substantial amount of electronic memory to store signatures of revelevant targets in various aspects by class, terrains, weather conditions, temperatures, times, etc. The user supplies the classes to be used, environmental data, data on the utility device and weighting factors for the classes of targets just prior to each mission. The communication link is used to pass location (and extent) data on targets uniquely detected by one sensor, such as 17A or 18A, between the subcircuits from the sensor which is best able to detect that class of targets. This insures that the same targets are processed by all subcircuits. The final decision circuit stores a set of rules with which it examines the classifications and priorities for each target supplied by the subcircuits. As a result of this, the targets emerge listed in order of priority with only one classification and one priority. The total number of targets is also reduced to match the capabilities of the utility device, if necessary.

One example of prioritizing for a utility device might be based on the capabilities of a particular weapon system. Assume that a gunship can carry Q1 rounds for a class assigned to tanks, Q2 rounds for armored personnel carriers and Q3 rounds for trucks, etc. The values of variables Q1, Q2 and Q3 then determine the numbers of targets in each class. The classes and targets within each class may then be weighted by the user in accordance with the threat they present to the gunship or ground forces being supported. Targets which correlate more closely to tanks and present a greater threat are prioritized 1, 2–Q1; and similarly for other classes. While TV and FLIR sensor modules are presently preferred, other types of sensors that have unique false alarm patterns, such as vibration or sound detectors may be substituted or added to form triple or higher order sensor systems.

Figure 2:
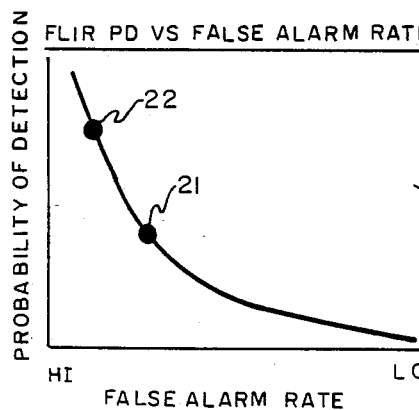
FIG. 2 shows a graph of the general operating characteristics of an ATR based on a TV type sensor.

As shown in FIG. 2 by the curve 21 of probability of detection versus false alarm rate for a FLIR ATR system, these two quantities vary in direct proportion. Note that false alarm rates are plotted backwards, so that the most desirable values of both quantities are found furthest from the origin.

Figure 3:
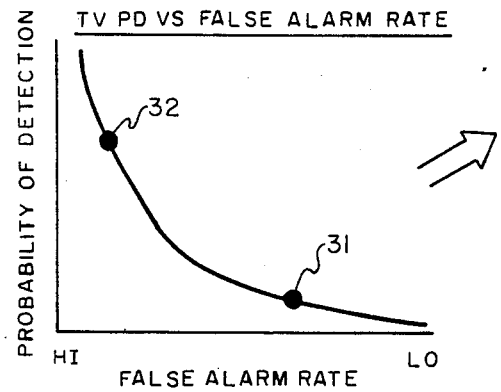
FIG. 3 shows a graph of the general operating characteristics of an ATR based on a FLIR sensor.

As shown in FIG. 3, there is a similar curve for a TV ATR system. In both curves, of course, zero detections coincides with zero false alarms. The shape of the curves is heavily dependent on the quality and quantity of information supplied by the sensor. This in turn depends on the nature of the target and background conditions. Few sensors will be able to provide one hundred percent probability of detection, even with the most elaborate data processing. On the other hand, one hundred percent false alarm rates are quite possible. Points 21 and 31 in FIGS. 2 and 3 represent the nominal operating conditions for single sensor ATR systems. In the FLIR system this point is normally chosen to provide a high probability of detection which results in a medium false alarm rate. In the TV system even when this point is chosen to provide a relatively low probability of detection there is still a high false alarm rate. Even a medium false alarm rate is not acceptable. The present invention has found a way to operate both sensors at higher thresholds than indicated by the points 22 and 32 to achieve much higher probabilities of detection, particularly for the TV and ATR subsystem, and avoid the unacceptable false alarm rates.

The factors that are most important to the present invention do not show in these curves, i.e., which specific targets are causing the false alarms. The present inventors have found that the TV and FLIR sensors do not usually give false alarms on the same types of targets. TV ATR systems usually give false alarms on heavy shadows which occur when the sun is at a low angle in the sky. FLIR ATR systems usually give false alarms on hot objects most prevalent when the sun is at a high angle. Obviously there is a lack of correlation in these types of detections. Other detection factors in backgrounds and the targets themselves show a similar lack of correlation. Actual field tests have confirmed this fact. It is expected that other sensors detecting different frequency bands or sound waves or doppler effects due to target motion or vibration will show a similar lack of correlation. Module 31 can obviously be expanded to include additional ATR subcircuits for these detectors and direct links like link 19 can be provided for them. For each sensor added to an ATR system after the first, a communication link must be provided between it and each sensor already in the system. The links, like the subcircuits, may be part of module 13 in all cases.

Figure 4:
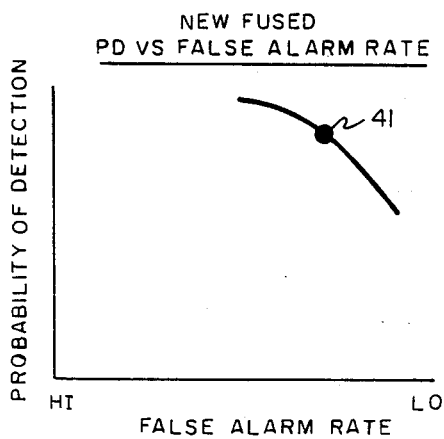
FIG. 4 shows a graph of general operating characteristics of an ATR based on using both TV and FLIR sensors.

FIG. 4 shows the probability of detection versus false alarm rate curve that can be achieved by properly fusing the outputs of TV and FLIR sensors. The ATR subcircuits can be provided by an existing device known as a "PROTOTYPE AUTOMATIC TARGET SCREENER", (PATS II). This system uses all of the data previously mentioned to detect, locate and classify targets using TV and FLIR imagers or sensors. Using imagers with the same scan sequences simplifies this circuitry. The FLIR sensor, in this case, is preferably given responsibiity for detecting and locating all targets to be classified and directs the TV sensor through link 19 in FIG. 1 to examine each target space in its field of view. If the TV fails to detect a target to which it has been directed by the FLIR then classification and prioritization are based solely on confidence (correlation) factors from the FLIR subcircuits.

For one application the sensors were programmed to recognize tanks (T), armored personnel carriers (A), and trucks (W). If a target was detected but could not be classified as one these specific targets it was classified as an unknown (U). The symbol (?) used in the Rules below indicates either (T), (A), or (W), and does not change meaning within a Rule. The symbol (P) indicates a target which has a priority at or higher than the threshold level specified by the user and (NP) targets with priority values below that threshold. The final decision circuit in module 13 referred the classification of the individual sensor circuitry using the following rules:

1. If both sensors make the same classification, this becomes the final classification;
2. If the FLIR ATR circuit classifies the target as (T) and the TV ATR circuit as (W), then the final classification is (W);
3. If the FLIR ATR circuit classifies the target as (U) and the TV ATR circuit as (?), then the final classification is (?);
4. If the FLIR ATR circuit classifies the target as (?) and the TV ATR circuit as (U), then the final classification is (?);
5. If the FLIR ATR circuit classifies the target as (A) and the TV ATR circuit as (W), then the final classification is (W);
6. If the FLIR ATR circuit classifies the target as (NP) and the TV ATR circuit as (P), then the final classification is (P);
7. If none of the above apply the FLIR ATR circuit classification becomes the final classification.

The above rules are easily translated into logic circuitry using the proper logic circuit gates in decision module 13.

I claim:

1. An improved ATR system for detecting, identifying and prioritizing targets from a plurality of detected targets, including:
   a plurality of sensor means for detecting mutually exclusive sets of waves emanating from the environment including said targets;
   all of said sensors being passive and having response thresholds low enough to detect all possible targets including a very large number of false targets;
   a sub-ATR circuit means coupled to each of said sensors for locating, classifying, prioritizing and listing a separate preselected quota in each of a preselected number of classes of targets detected by said sensors, in accordance with prerecorded target signatures and other user constraints,
   a first of said sensors having a lower probability of detection for a given false alarm rate than a second of said sensors, but based on a different distribution pattern of false alarms among said targets;
   a final decision means coupled to all of said sensors for reassigning the classifications and priorities of targets detected by both of said sensors according to a preselected set of logical classification rules.

2. A system as in claim 1, wherein:
said first sensor means detects light in the visible and near visible region of the EMR spectrum.

3. A system as in claim 1, wherein:
a second sensor means detects light in the far-infrared region of the EMR spectrum.

4. The system according to claim 1 including:
means to transmit the locations of targets detected by one of said sensors to another of said other sensors, such that all sensors detect all said listed targets.

5. The method of identifying high priority targets detected only by a plurality of passive sensors having different patterns of false alarms among said targets, comprising the steps of:
   a. setting the detection thresholds of said sensors to produce a very high probability of detection;

b. recording the locations of said targets as primary identification;
c. classifying said targets according to target signatures appropriate to the target environment;
d. prioritizing said targets with user supplied criteria and calculated level of confidence in their classification;
e. listing at most a preselected quota of targets for each of said sensors in accordance with their priority and user supplied constraints for each class of targets; and
f. repeating steps B, C, and D for all listed targets from all sensors according to a preselected set of logical classification steps.

6. The method according to claim 5 wherein said sensors comprises a FLIR and a TV camera; the possible target classifications comprise a tank (T), a personnel carrier (A), a truck (W), one of the preceeding targets (?), unknown (U), low or no priority (NP) and high priority (P); and said logical steps comprise:

E1. If both sensor circuitry make the same classification, this becomes the final classification;
E2. If the FLIR circuitry classifies the targets as (T) and the TV circuitry as (W), then the final classification is (W);
E3. If the FLIR circuitry classifies the targets as (U) and the TV circuitry as (?), then the final classification is (?);
E4. If the FLIR circuitry classifies the targets as (?) and the TV circuitry as (U), then the final classification is (?);
E5. If the FLIR circuitry classifies the targets as (A) and the TV circuitry as (W), then the final classification is (W);
E6. If the FLIR circuitry classifies the targets as (NP) and the TV circuitry as (P), then the final classification is (P);
E7. If none of the above apply the FLIR circuitry classification becomes the final classification.

* * * * *